United States Patent Office 3,510,392
Patented May 5, 1970

3,510,392
GLASS NODULES IN CELLULAR POLYURETHANE
Dominic D'Eustachio, Pittsburgh, and Marshall M. Levy, Monroeville, Pa., assignors to Pittsburgh Corning Corporation, Pittsburgh, Pa., a corporation of Pennsylvania
Continuation-in-part of abandoned application Ser. No. 644,403, June 7, 1967, which is a continuation of abandoned application Ser. No. 318,850, Oct. 25, 1963. This application Sept. 16, 1968, Ser. No. 760,040
Int. Cl. B32b 5/16, 27/04, 33/00
U.S. Cl. 161—162
6 Claims

ABSTRACT OF THE DISCLOSURE

This disclosure relates to a lightweight structural unit of substantially spherical cellular glass nodules in a continuous matrix of a cellular organic binder. The cellular glass nodules include a core of cellular glassy material formed from a plurality of small uniform cohered bubbles of glass and a relatively thin continuous outer skin of a chemically durable glassy material. The cellular glass nodules are impervious to liquids or gases, have a low density and a low thermal conductivity. The cellular glass nodules are bonded into a unitary structural member by a matrix composite of cellular polyurethane. The nodules are slightly displaced from each other by the polyurethane matrix if each nodule is coated before foaming commences and the structural member has high attenuation for elastic waves and serves as an acoustic absorber.

CROSS REFERENCES TO RELATED APPLICATIONS

This application is a continuation-in-part of copending application Ser. No. 644,403 filed June 7, 1967, which, in turn, is a continuation of application Ser. No. 318,850 filed Oct. 25, 1963, each application now abandoned.

BACKGROUND OF THE INVENTION

Field of the invention

This invention relates to a heterogeneous lightweight cellular glass structural material and more particularly to a shaped composite cellular glass structural unit having cellular glass nodules displaced from each other and bonded into a shaped form by a secondary material.

Description of the prior art

Cellular glass is an inorganic material that has many desirable properties. It is dimensionally stable, has a low density and a low thermal conductivity, and can withstand substantial compressive forces. Cellular glass is used extensively as an insulating material and, when the cells are opened as described in U.S. Pat. No. 2,596,659, as an acoustic material in building structures. The cellular glass blocks, however, are relatively expensive to produce and their application is limited because the material has, in the past, been manufactured only in rectangular blocks of limited size. Shapes such as pipe covering must be shaped by gluing blocks of cellular glass together and then cutting the desired shapes. It has not been found possible to mold shapes directly from cellular glass because of the high temperature at which the material is plastic.

Sandwich structures have been prepared in the past using a core or filler material of thin walled hollow beads coated with a powdered metal and a thermosetting resin. U.S. Pat. No. 2,806,509 entitled "Sandwich Structures" discloses such a filler material. Thin walled hollow beads are mixed with the powdered metal and thereafter a resin dissolved in a solvent is added to the mixture. The solvent is evaporated from the mixture to produce dry hollow beads coated with a mixture of the resin and powdered metal. The coated beads are placed between skins and subjected to an elevated temperature and pressure to cure the resin and bond the beads to each other and to the skins. This type of sandwich structure, although relatively light in weight, is brittle and does not possess high attenuation for elastic waves and is unsuitable as an acoustic absorber. The thin walled hollow beads provide limited compressive strength for the sandwich structure and the sandwich structure is dependent on the skins primarily for strength in both compression and tension.

SUMMARY OF THE INVENTION

There is a need for a polyfunctional building material that has the desirable properties of incombustibility, dimensional stability and water resistance of cellular glass and which, in addition, is inexpensive to manufacture and can be molded or shaped at low cost. For many uses it is desirable that the building material have nail holding power and high attenuation for elastic waves so that it will not transmit sound. This type of building material could be used as a building panel in vertical curtain wall structures and as a substitute for presently known building panels.

It has been discovered that a composite structure of lightweight cellular glass nodules and a foamed organic binder has the above discussed desirable properties of cellular glass blocks in that the composite structure has a low thermal conductivity and is dimensionally stable under wide temperature variations. The composite structure is tough and relatively flexible because the cellular glass nodules are displaced slightly from each other by the foamed organic binder. The composite structure does not readily transmit sound therethrough and serves as an excellent material for curtain wall structures. The composite structure may be used in panel form as a structural member and can be made to hold nails or other types of fasteners. The composite structure is inexpensive to manufacture and is polyfunctional in that it can be made into lightweight high strength intricately shaped structures. The foamed organic binder permits conjoint bonding of surface materials such as wood veneer, aluminum, paper and the like without using additional additives or processing steps. Because structures or panels can be molded to size, a minimum of trim or cutting loss is experienced.

The composite structure has desirable structural properties in that it can support substantial loading in compression and has excellent fire resistant properties. The organic binder can be nonmelting and self-extinguishing and the composite structure is considered from a practical aspect to have improved flame retarding properties. The amount of organic material needed to produce the composite is the smaller volume fraction of the glass-organic composite. For this reason and for other reasons not entirely clear, the composite has improved fire resistance when compared to the organic binder per se.

One form of the invention is directed to a composite structural material having as a primary constituent substantially spherical cellular glass nodules that are in juxtaposed random spaced relation to each other and as a second constitutent a foamed or cellular organic plastic material that substantially fills the interstitial spaces between the cellular glass nodules.

One method of forming a shaped composite structural unit or panel is to deposit a preselected amount of the reactive components of the organic plastic material into a suitable mold having a cavity of desired shape and dimensions. Cellular glass nodules are then poured in the mold cavity so as to substantially fill the remainder of the mold cavity. The mold is next heated to an elevated temperature to react and polymerize the organic plastic components and also to foam or cellulate the organic plastic material. During the foaming or cellulation of the organic plastic material the interstitial voids between the stacked cellular glass nodules are essentially filled with cellular organic plastic material.

Another method for forming the composite structural unit or panel is to spray a suitable organic binder containing a foaming agent into a mold or other container and at the same time blow cellular glass nodules into the container in such a manner that the sprayed material impinges on the cellular glass nodules causing them to adhere to each other. At the same time, or shortly thereafter, the organic material expands by foaming and fills the void spaces between the cellular glass nodules. If the entire surface of the nodules is spray coated with the organic material, then it may be possible to displace the glass nodules slightly from each other, when the composite is allowed to "free-expand" during the cellulation process.

Accordingly, the primary object of this invention is to provide a nonbrittle material that is essentially cellular glass and is moldable at a temperature substantially lower than the softening temperature of glass.

Another object of this invention is to provide a new and useful composite structural material having as one of its constituents a low cost, dimensionally unstable material, the composite material having dimensional stability under a wide range of temperature variations.

Another object of this invention is to provide a new and useful structural material having as its principal constituent cellular glass nodules bound or bonded to each other by a suitable binder in such a way that the nonburning characteristic and water resistance of the glass nodules remains an important property of the composite.

A further object of this invention is to provide a unitary structural material that has as its principal constituent cellular glass nodules and as a second constituent a foamed or cellular organic plastic material that fills the interstitial voids between the nodules.

Another object of this invention is to provide a structural unit that comprises a high volume of cellular glass and which is tough, has high tensile strength and is lightweight, with low thermal conductivity and improved acoustical transmission loss so that it is very useful as a sound barrier.

Figure 1:
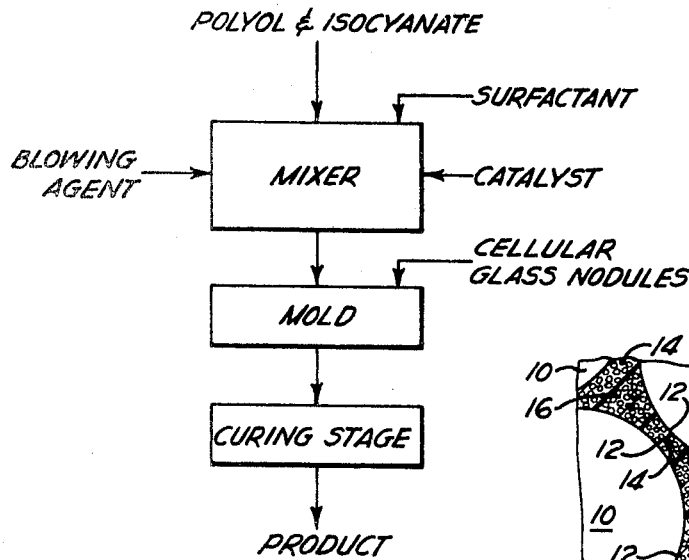
FIG. 1 is a diagrammatic flow sheet of the steps involved in the practice of one form of this invention.

Referring to the drawings and more particularly to FIG. 1 there is diagrammatically illustrated one method of forming an improved structural material having as its principal constituent cellular glass nodules and as a second constituent a cellular polyurethane material. The cellular glass nodules and a process for making the glass nodules is described in U.S. Pat. 3,354,024 entitled "Cellular Glass Nodules."

The cellular glass nodules are substantially spherical in shape and may be made at various densities and size. The nodules in the composite material have a density of about 10 pounds per cubic foot and are closed cell structures. The cellular glass nodules have a core of cellular glassy material with a plurality of small cohered bubbles of glass and a thin outer skin of glassy material having a composition other than the composition of the core of glassy material. The cellular glass nodules are formed by admixing glass particles and a cellulating agents with a liquid binder that includes sodium silicate. The admixture is pelletized and the pellets are dried to permit the sodium silicate to migrate toward the pellet surface. The dried pellets are coated with an aluminum hydrate and then subjected to a cellulating temperature of about 1600° F. The pellets cellulate and form cellular glass nodules with a core of uniform closed cells. The aluminum hydrate reacts with the sodium silicate to form a thin continuous skin of a glassy material that provides a chemically durable surface for the nodule.

The cellular nodules, because of the closed cell arrangement, do not absorb the organic plastic material during the cellulation of the material and, therefore, make it possible to use only small volume amounts of the organic material. Volumetric ratios of as high as 30 parts of cellular glass nodules to 1 part of uncellulated plastic material have been attained by using the cellular glass nodules described in the above U.S. patent to provide about equal volumes of nodules and cellular plastic material after cellulation of the plastic material that is capable of withstanding substantial compressive forces. Single celled nodules do not have the internal web configuration of the multicellular glass nodules and do not, therefore, withstand the same compressive forces as the multicellular glass nodules.

Although the nodules have a density of about 10 pound per cubic foot, which is about the same density as a cellular glass block, when the nodules are formed into a shaped structural material the effective or bulk density of the cellular glass nodules is about 6 pounds per cubic foot. The lower effective or bulk density is due to the interstitial voids between the substantially spherical cellular nodules. It is, therefore, possible to form a structural unit with cellular glass nodules that has an effective density less than a structural unit formed from a cellular glass block. Thus the composite structural unit is lighter than a structural unit made with only cellular glass. The foamed plastic material has a density much lower than cellular glass and when the interstitial voids between the nodules are filled with the foamed plastic material the structural unit is still much lighter than a cellular glass block.

Initially the constituents of the polyurethane formulation are prepared in the following manner. A suitable polyol and/or polyester are reacted with an organic polyisocyanate to form urethane. An excess of the polyisocyanate may be present to later react with water during cross linking to provide a gaseous blowing agent for foaming the polyurethane material. Alternatively, substantially all of the polyisocyanate may be reacted with the polyol and a halogen substituted lower molecular weight alkane may be used as a blowing or foaming agent during the cross-linking of the polyurethane.

The reactive components are homogeneously mixed in a suitable mixture device with a surfactant and suitable catalyst to control the rate of reaction. Representative catalysts are tertiary amines, organo metallic compounds such as cobalt and nickel naphthenates and linoleates. Suitable well-known surfactants are employed to control cell size during the foaming process. Formulations and methods for preparing foamed polyurethane materials are described in the following U.S. patents, No. 3,029,209; No. 3,021,290; and No. 3,072,582, and do not form a part of the present invention.

The homogeneous admixture of the organic constituents, catalyst, surfactant, and blowing agent is then deposited in the bottom of a mold cavity. Cellulated glass nodules are then poured into the mold cavity and substantially fill the mold. A cover is placed over the mold cavity and the reaction and foaming necessary to form cellular polyurethane is permitted to take place. The reaction and foaming can, when necessary, be aided by heating the charged mold by suitable means such as an oven. It has been found that a suitable cellular polyurethane can be foamed and cured by maintaining the mold at a temperature of about 300° F. for approximately 30 minutes. It will be appreciated, however, by changing the ratios of the various constituents in the formulation that the curing time and temperature can be varied over a range from a few minutes to several hours for curing time and from ambience to 400° F. for curing temperature. During foaming, the polyurethane expands in the mold and fills the interstitial spaces between the cellular glass to serve as a binder and hold the cellular glass nodules in the shape of the mold cavity and form a semi-rigid structural unit. The thickness of the layer between the glass nodules affects the properties of the composite and can be controlled by the size of the mold cavity, the proportions of the nodules and polyurethane constituents placed in the mold cavity, the density of the nodules, and the size distribution of the nodules. Upon completion of the reaction the semi-rigid structural unit is removed from the mold and can be trimmed and shaped if further modification is desired.

Figure 3:
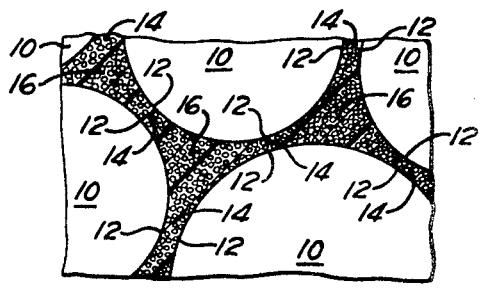
FIG. 3 is an enlarged view in section of the improved structural material illustrating in detail the cellular glass nodules slightly displaced from each other, and the density difference of the foamed organic material achieved when filling the interstitial voids between the adjacent cellular glass nodules.
Figure 2:
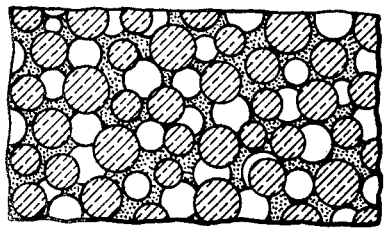
FIG. 2 is a cross section of the improved structural material.
Figure 4:
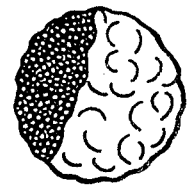
FIG. 4 is a view partly in section of a cellular glass nodule.

Referring to FIG. 3 there is illustrated the foamed polyurethane material having different densities that are achieved when the polyurethane material foams and fills the interstitial voids between the cellular glass nodules. In FIG. 3 the nodules are generally designated by the numeral 10 and are randomly oriented in the foamed polyurethane material. The cellular glass nodules 10 abut each other at surfaces 12 when they are poured into the mold cavity. During foaming the polyurethane material increases in volume and flows between the juxtaposed cellular nodules. The polyurethane material has a relatively high viscosity and does not foam to the same degree between the adjacent surfaces of the nodule as it does in the other void spaces. This causes the density to differ substantially at various places within the composite material. For example, the foamed polyurethane material, generally indicated by the numeral 14, between the surfaces 12 has a much higher density than the foamed polyurethane material at the void space indicated by numeral 16. It is believed that the polyurethane foam material 14 between surfaces 12 has a density of between 4 and 5 pounds per cubic foot, whereas the polyurethane material at 16 may have a density below 2 pounds per cubic foot. The high density polyurethane material has many desirable properties when compared to low density polyurethane material that provide both strength and rigidity to the composite material. The discovery that a foamed binder when used with closed, non-absorptive spherical nodules can behave as illustrated in FIG. 3 is one part of this invention. The high density, of course, is limited to only a small volume of the binder used. In this manner, the superior mechanical properties of high density foams are available to the composite and at the same time the amount of binder is sufficiently limited to retain, for the composite, its essentially cellular glass characteristic.

Where it is desired to make a building panel several inches thick, a rectangular shallow mold is employed and skin materials such as sheet aluminum, paper and wood veneers may be conjointly bonded to the composite structure by the polyurethane foam during the foaming process.

The building panels made according to the above process are uniform in that the cellular glass nodules are distributed substantially uniformly throughout the cellulated polyurethane material. In the composite structure the polyurethane material may be likened to the continuous phase and the cellular glass nodules the discontinuous phase. The composite structure in effect is a heterogeneous system wherein the desirable properties of both components augment each other. For example, the relatively tough polyurethane material overcomes the brittle nature of the cellular glass nodules. The low density of both the cellular glass nodules and the cellulated polyurethane material provides a composite structure of desirable low density and low thermal conductivity. The rigidity of the cellular glass nodules provides the desired structural strength especially when the composite structure is subjected to compressive forces.

Another unobvious desirable property of the composite structure is the dimensional stability. Temperatures of 350° F. can be maintained with only a 1 to 2 percent change in volume, while shrinkage at −80° F. is indiscernible. The accelerated humid aging test on foamed plastic materials is normally carried out at 158° F., 100 percent relative humidity for four weeks. This test demonstrated volume increases of less than 5 percent as compared with polyurethane foam values of more than 10 percent for the better urethane materials. Another intrinsic property of the composite structure is its freeze-thaw resistance. The composite structure shows little deleterious effects under such conditions, which, though severe, are frequently encountered in structures exposed to the weather.

Several building panels approximately two inches thick were made according to the above process and were subjected to an ad hoc nail holding test. The building panels were compared with a commercial grade Gypsum wallboard ⅜″ thick, a polyurethane panel two inches thick having 1.9 pounds per cubic foot density and a cellular glass block two inches thick having 9 pounds per cubic foot density.

The following tabulation of the withdrawal load in pounds required to remove the nails and other fasteners illustrates the superior nail holding power of a composite board having as a principal constituent cellular glass nodules and foamed polyurethane as the other constituent. The composite boards in Examples 5 and 6 were formed with nodules of substantially the same size. The density of the nodules in all the examples was substantially the same. In Examples 5 and 6 the nodules were substantially the same size, whereas in Example 7 two different sized nodules were employed.

SUMMARY OF COMPOSITE NAIL HOLDING POWER

| Example | Item | Withdrawal Load (Tension), Pounds [a] | | | Comments |
|---|---|---|---|---|---|
| | | Threaded Nail | 6d Box Nail | 2 x 8 Screw | |
| 1 | Gypsum wallboard ⅜″ thick | 2.8–5.5 | 5.2–8.6 | 44.4–56.8 | Commercial grade. |
| 2 | Foamed polyurethane (1.9 p.c.f.) 2″ thick | 1.2–2.1 | 2.0–2.3 | 15.5–19.7 | Do. |
| 3 | Cellular glass block 2″ thick | Nil | Nil | Nil | Do. |
| 4 | Composite panel 2″ thick | Nil | 1.0–2.4 | 15.6–17.3 | 9.5:4 nodule and urethane density. |
| 5 | do | 0.6–1.3 | 2.3–7.2 | 16.4–26.1 | 9.5:9.2 nodule and urethane density. |
| 6 | do | 0.6–3.7 | 3.0–7.5 | 38.9–68.4 | 9.5:14.4 nodule and urethane density. |
| 7 | do | (b) | 2.5–12.4 | (b) | 2 different sized nodules w./6 p.c.f. urethane. |

[a] Based on values of 6 specimens for each test.
[b] Not available.

It is apparent from the foregoing tabulation that the composite panels have superior nail holding power when compared with either a panel of cellular glass or a panel of foamed polyurethane, the constituents of this composite panel. Where different sized cellular glass nodules are used in the composite panel, the nail holding power is improved when compared with a panel utilizing only a single sized nodule.

The nail holding power of the composite material is attributed in part to the frangible properties of the cellular glass nodules. The organic foam at the low density present in the composite structural material is not in itself tough enough to hold nails and hence alone it has little nail holding power. The cellular glass nodules in the composite provide the desired rigidity and, in addition, it is believed that glass particles are abraded from the glass nodules by the nail as it penetrates the composite and serves to increase the frictional resistance between the nail and foamed organic material.

Figure 5:
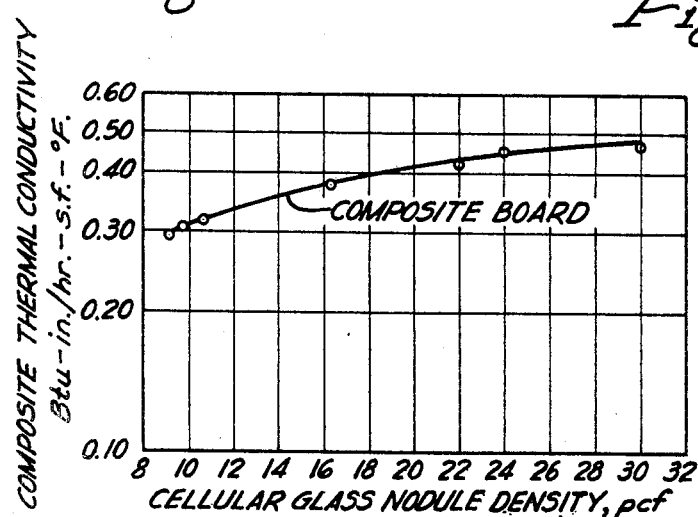
FIG. 5 is a graphical representation of the thermal conductivity at a mean temperature of 50° F. of the structural unit at various cellular glass nodule densities.

FIG. 5 illustrates the improved thermal conductivity of the composite panel at 50° F. The composite panel with a cellular glass nodule density of about 9 pounds per cubic foot has a sufficienttly low thermal conductivity to be used as a substitute for other organic plastic foam types of insulating materials having about the same density.

Figure 6:
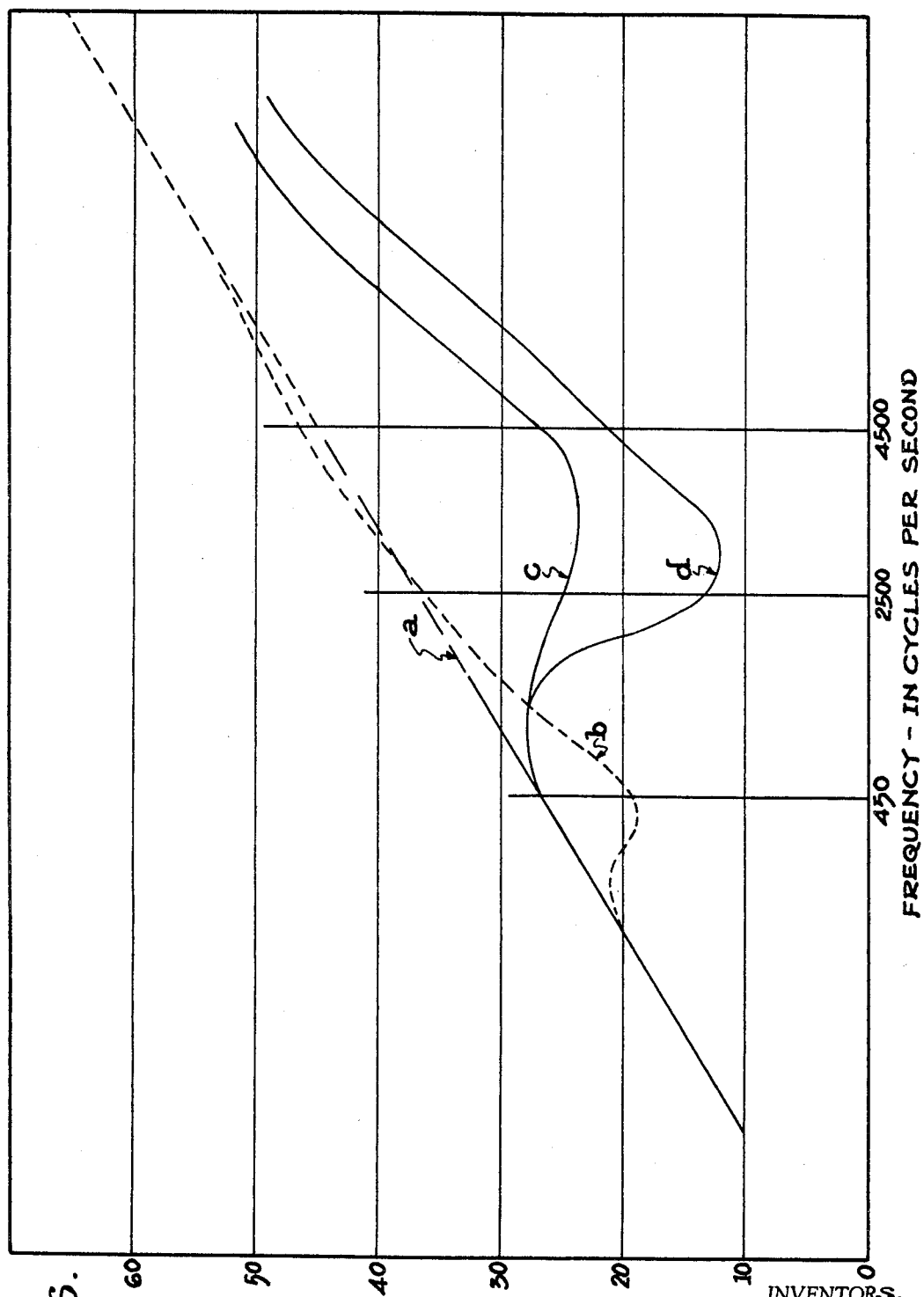
FIGS. 6 and 7 illustrate the superior acoustical transmission loss properties of the composite material.
Figure 7:
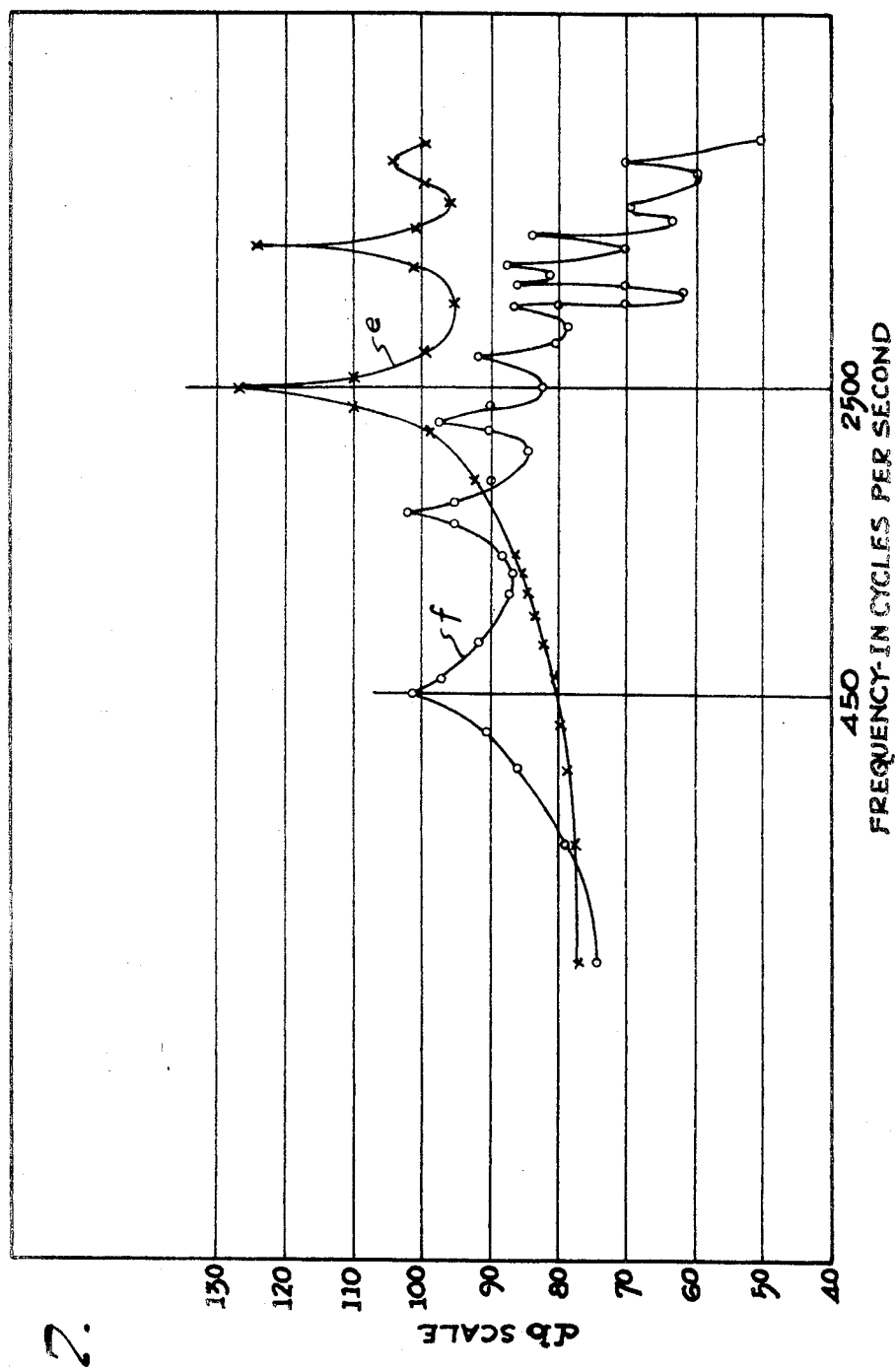

FIGS. 6 and 7 illustrate the improved acoustical transmission loss of the composite material. FIG. 6 is a graphical representation of the performance of the composite material, cellular glass and lead. The curve $b$ represents the transmission loss of the composite and curves $c$ and $d$ represent the transmission loss of lead and cellular glass respectively.

It is well known that all solid, nonflexible materials have elastic properties and can vibrate when excited by an external force such as sound energy, or the like. The elastic properties of the material and the surface density determine its acoustic transmission loss. The behavior of a "limp" material is illustrated by the straight line $a$ in FIG. 6 wherein the transmission loss of the material measured in decibels increases at the rate of 6 decibels per octave. The linear relationship of line $a$ is commonly referred to as the mass law wherein the rate of increase of transmission loss with frequency remains constant throughout all frequencies. Curves $b$, $c$ and $d$ deviate from the mass law at a frequency corresponding to the allowed standing waves. At the critical frequency the material, because of its stiffness in the particular member being tested, resonates and vibrates with amplitude large enough to transmit substantially more sound than if the member were "limp" and acting only as a mass driven by the available acoustic energy.

As the material under test approaches the theoretically ideal behavior, curves of the type shown in FIG. 6 approach the straight line. Material represented by the nearest approach to the straight line is more desirable as a building material because it is more effective in preventing undesirable transmission of sound from one space to another.

FIG. 6 clearly illustrates the superior properties of the composite material in this regard. The critical frequency at which the composite material deviates from the mass law is much lower than that for either lead or cellular glass. In addition, FIG. 6 illustrates that the composite material has a reduced transmission loss for a relatively narrow frequency band whereas cellular glass maintains a reduced transmission loss over a wider band of frequencies before the slope of either of the curves again approaches that of the slope of the curve of mass law. The graphical illustration of FIG. 6, therefore, clearly illustrates the superior and desirable elastic properties of the composite material when compared with cellular glass.

The data for the curves in FIGS. 6 and 7 was obtained by subjecting bars of composite material, cellular glass and lead 1″ in cross section by 12″ in length to vibrations at different frequencies. Measurement of the vibrations transmitted through the bars was made by the conventional means.

FIG. 7 graphically illustrates the reason for the superior behavior of the composite. Curve $e$ illustrates the resonance property of cellular glass and curve $f$ the resonance property of the composite material. The first resonance frequency of cellular glass was measured at a frequency of approximately 2,500 c.p.s., and the first resonance frequency for the composite material was measured at a frequency of about 450 c.p.s. These measurements were made on 12 inch long bars. In practice, one is concerned with the behavior of a wall which is very much larger than the bars tested. Because of the larger size, the resonance frequency of a wall would be much lower than the figures given above. While the exact resonance frequency will depend on many factors and can only be determined by measurement of a specific wall structure, the significant displacement to a much lower frequency will hold true. The ratio of the height of the peaks at the first resonance frequency to the widths of the peaks taken at half amplitude is a measure of the internal viscous damping characteristics of both cellular glass and the composite material. The smaller the ratio of height to width, the greater is the damping (internal energy loss due to inelastic volume change), and the less resonant is the material. It is evident in FIG. 7 that the composite material has a much smaller ratio of height to width than the cellular glass and hence the damping characteristics of the composite material are superior to that of cellular glass. It is apparent from the above discussed graphical representations that the composite material is superior in all respects to cellular glass for constructing building members with low sound transmission. To be competitive and hence useful in the building field, the density of polyurethane foam materials must be kept low, generally less than 2 pounds per cubic foot. Such polyurethane foams are known to transmit sound freely. This well known fact does not lead one to expect the unusually good performance of the composite material.

The composite material having as a primary constituent the substantially spherical cellular glass nodules and as a second constituent a foamed polyurethane organic material, exhibited the desirable properties of having the compressive characteristics of the cellular glass nodules and the composite material tensile characteristics substantially modified by the foamed polyurethane. The foamed polyurethane at practical densities has inferior compressive properties when compared with cellular glass. Likewise, other binders, when reduced in density so they can be effectively used as insulating materials, have low compressive strength by themselves. Foamed concrete, for example, at a density of 20 pounds per cubic foot, is about 50 pounds per square inch. The cellular glass, because it is brittle, performs poorly in tension. The composite, however, has the desirable compressive properties of the cellular glass in that the nodule, although randomly oriented in the composite material, resist compressive forces to a much greater extent than the foamed polyurethane to thereby provide a material capable of resisting substantial compressive forces. Likewise, the composite material because it is not completely rigid and brittle, can flex slightly and so exhibits improved tensile properties when compared with cellular glass.

It will be appreciated that the polyurethane foam can be admixed with the cellular glass nodules in a manner that the polyurethane foam is dispersed through and binds the cellular glass nodules adjacent the surface of the panel to form a semi-rigid panel with a core of essentially abutting, substantially spherical cellular nodules. The spaces between the nodules in the core in this arrangement are dead air spaces which provide low thermal conductivity and excellent insulating properties.

The polyurethane foam may be applied to the surface of the panel by distributing a preselected amount of the foam constituents on the bottom surface of the mold and then spreading a layer of the foam constituents admixture on the top surface of the nodules that substantially fill the mold. During the foaming of the polyurethane the top or bottom layers of polyurethane would expand toward the center of the panel. The quantity of the polyurethane in the layers would not, however, be sufficient upon expansion of the foamed polyurethane to fill all the interstitial void between the nodules in the core of the panel.

Because polyurethane foams have many desirable properties and are inexpensive and readily available, the composite structural unit has been described as utilizing this type of foamed material as one of its constituents. Inexpensive, so-called inferior foamed organic materials not presently commercially acceptable, may be used in forming our composite material because the foamed organic material may differ substantially in physical properties without substantially altering the properties of the composite material. It is believed that the use of these commercially unacceptable foamed materials as a constituent of our composite material is made possible by the fact that the composite material includes a large volume of cellular glass with only the interstices between the spherical cellular glass nodules filled with the foamed organic plastic material. It should, therefore, be understood, that many low cost foamable organic plastic materials such as phenolic and polyvinyl compounds may be used as a cellular binder for the cellular glass nodules to form a structural panel. It should also be understood that premium materials such as epoxy or silicone compounds are also suitable because of the small quantities of the foamed material required in our composite.

As previously discussed, the cellular glass nodules are closed cell material. Because of the closed cell characteristics of the cellular glass nodules it is possible to obtain a high volumetric ratio of the cellular glass nodules to the plastic material.

In certain types of structural panels where a cellulated or foamed organic binder is undesirable, other types of adhesives can be employed to bind the cellular glass nodules into a shaped member. For example, the foamable organic plastic materials, including urethanes, can be utilized in their uncellulated form to bind the cellular glass nodules to each other. Organic thermoplastic or thermosetting resins can be employed to bind the nodules into a shaped structural member. Inorganic materials such as sodium silicates and mixtures thereof may be employed. Cementitious materials such as cements, plastic and Gypsum will effectively bind the nodules into a shaped member. Likewise, natural and synthetic glues, starches and the like may serve as an adhesive.

Where structural panels are constructed of materials that are not foamed, substantial strength is provided to the panel by the spherical shape of the cellular glass nodules and the fillets of the nonfoamed binder material formed by encapsulating the spherical cellular nodules. The spherical shape of the nodule provides an ideal shape to the fillets of the binder material so that the structural panel resists buckling or lateral displacement of the cellular glass nodules under compressive forces. In every case the combination of cellular glass nodules and the binder material is adjusted to take advantage of the moldable properties of the continuous phase or medium to make a material that, by volume, is essentially cellular glass and is moldable into desired shapes.

We claim:

1. An acoustic structural material for providing high attenuation for elastic waves and having improved transmission loss properties comprising substantially spherical multicellular glass nodules bonded into a unitary member by a continuous matrix of a cellular polyurethane polymer, said multicellular glass nodules having a core of cellular glassy material formed from a plurality of separate closed cells and a relatively thin continuous skin of chemically durable glassy material, said multicellular glass nodules being impervious to liquids, said multicellular glass nodules arranged in random juxtaposed relation with void spaces formed therebetween by the substantially spherical shape of said multicellulas glass nodules, said cellular polyurethane polymer substantially filling the void spaces between said multicellular glass nodules, said cellular polyurethane polymer bonding said spherical multicellular glass nodules into a shaped integral composite unit, said composite of cellular polyurethane polymer and said spherical multicellular glass modules having flexural properties substantially the same as said cellular polyurethane polymer and compressive properties substantially the same as said spherical multicellular glass nodules.

2. An acoustic structural material as set forth in claim 1 in which said layer of cellular polyurethane polymer between adjacent spherical multicellular glass nodules has a density of about 5 pounds per cubic foot and said cellular polyurethane polymer in said void spaces formed between adjacent multicellular glass nodules has a density of less than about 2 pounds per cubic foot.

3. An acoustic structural material as set forth in claim 1 in which said spherical multicellular glass nodules have a density of about 10 pounds per cubic foot.

4. An acoustic structural material as set forth in claim 1 in which said structural material has a density of about 8 pounds per cubic foot.

5. An acoustic structural material as set forth in claim 1 in which said structural material is dimensionally stable with less than about 3 percent change in volume when subjected to an elevational temperature of about 350° F.

6. An acoustic structural material as set forth in claim 1 in which said composite material frictionally engages and holds nails driven therein, and has nail holding properties greater than either constituent of said composite.

References Cited
UNITED STATES PATENTS

| | | | |
|---|---|---|---|
| 2,691,248 | 10/1954 | Ford | 161—168 |
| 2,803,575 | 8/1957 | Riddell et al. | 161—161 |
| 2,806,509 | 9/1957 | Bozzacco et al. | 161—161 |
| 3,147,177 | 9/1964 | Owens et al. | 161—161 |

WILLIAM J. VAN BALEN, Primary Examiner

U.S. Cl. X.R.

161—160, 161; 181—33; 260—2.5